United States Patent
Borchert et al.

(10) Patent No.: US 9,776,357 B2
(45) Date of Patent: Oct. 3, 2017

(54) METHOD FOR PRODUCING HOLLOW BODIES FROM THERMOPLASTIC MATERIALS BY USING AN AT LEAST THREE-PART BLOW-MOLDING TOOL AND APPARATUS FOR CARRYING OUT THE METHOD

(71) Applicant: Kautex Textron GmbH & Co. KG, Bonn (DE)

(72) Inventors: Matthias Borchert, Bonn (DE); Carsten Elsasser, Pulheim (DE); Klaus Esser, Konigswinter (DE); Cristoph Mehren, Konigswinter (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 120 days.

(21) Appl. No.: 14/409,672

(22) PCT Filed: Mar. 14, 2013

(86) PCT No.: PCT/EP2013/000756
§ 371 (c)(1),
(2) Date: Dec. 19, 2014

(87) PCT Pub. No.: WO2014/000833
PCT Pub. Date: Jan. 3, 2014

(65) Prior Publication Data
US 2015/0151476 A1    Jun. 4, 2015

(30) Foreign Application Priority Data
Jun. 26, 2012    (DE) ......................... 10 2012 012 529

(51) Int. Cl.
*B29C 49/00* (2006.01)
*B29C 51/10* (2006.01)
(Continued)

(52) U.S. Cl.
CPC ........ *B29C 49/0047* (2013.01); *B29C 51/105* (2013.01); *B29C 51/12* (2013.01);
(Continued)

(58) Field of Classification Search
None
See application file for complete search history.

(56) References Cited

U.S. PATENT DOCUMENTS

| 6,866,812 B2 | 3/2005 | Van Schaftingen et al. |
| 2008/0061470 A1 | 3/2008 | Borchert et al. |

(Continued)

FOREIGN PATENT DOCUMENTS

| CN | 101489759 A | 7/2009 |
| DE | 102006042065 | 3/2008 |

(Continued)

OTHER PUBLICATIONS

English language PCT International Search Report mailed Jul. 5, 2013, received in corresponding PCT Application No. PCT/EP13/00756, 2 pgs.

(Continued)

*Primary Examiner* — Monica Huson
(74) *Attorney, Agent, or Firm* — Grossman Tucker Perreault & Pfleger, PLLC (57) ABSTRACT

The invention relates to a method for producing hollow bodies from thermoplastic material by using an at least three-part blow-molding tool with at least two blow-mold halves (1a, 1b), which define a mold impression, have part-cavities (5a, 5b) and can be displaced toward one another and away from one another in the sense of an opening and closing movement, and also with at least one central tool (2), which is displaceable transversely in relation to the opening and closing movement of the blow-mold halves (1a, 1b), the method comprising the extruding or (Continued)

providing and arranging of at least two molten performs (7) of thermoplastic material in web form between the blow-mold halves (1a, 1b) in an opened receiving position, the bringing to bear of the preforms (7) in the part-cavities (5a, 5b) of the blow-mold halves (1a, 1b) and molding of them into shells (10) using sealing elements which are provided on the central tool and are extended from the central tool for the purpose of sealing off the part-cavities before or while the part-cavities are subjected to differential pressure; the joining of at least one insert (9) in at least one shell (10) by using the central tool (2) arranged between the blow-mold halves (1a, 1b) and the joining of the shells (10) to form the closed hollow body by closing the blow-mold halves (1a, 1b) while applying clamping force and, if appropriate, the final blow molding of the hollow body.

16 Claims, 9 Drawing Sheets

(51) Int. Cl.
  *B29C 51/12*  (2006.01)
  *B29C 51/26*  (2006.01)
  *B29L 31/00*  (2006.01)
  *B29L 22/00*  (2006.01)

(52) U.S. Cl.
  CPC .... *B29C 51/267* (2013.01); *B29C 2049/0057* (2013.01); *B29C 2791/006* (2013.01); *B29C 2791/007* (2013.01); *B29K 2995/0067* (2013.01); *B29K 2995/0069* (2013.01); *B29L 2022/00* (2013.01); *B29L 2031/7172* (2013.01)

(56) References Cited

U.S. PATENT DOCUMENTS

| | | |
|---|---|---|
| 2009/0026664 A1 | 1/2009 | Criel et al. |
| 2010/0255234 A1 | 10/2010 | Koetke |
| 2012/0013148 A1 | 1/2012 | Tomizawa et al. |
| 2014/0178522 A1 | 6/2014 | Borchert et al. |

FOREIGN PATENT DOCUMENTS

| | | |
|---|---|---|
| JP | S61228929 A | 10/1986 |
| WO | 9964221 A1 | 12/1999 |

OTHER PUBLICATIONS

English language PCT Written Opinion mailed Jul. 5, 2013, received in corresponding PCT Application No. PCT/EP13/00756, 7 pgs.

METHOD FOR PRODUCING HOLLOW BODIES FROM THERMOPLASTIC MATERIALS BY USING AN AT LEAST THREE-PART BLOW-MOLDING TOOL AND APPARATUS FOR CARRYING OUT THE METHOD

The invention relates to a method for producing hollow bodies from thermoplastic material by using an at least three-part blow-molding tool with at least two blow-mold halves, which define a mold impression, have part-cavities and can be displaced toward one another and away from one another in the sense of an opening and closing movement, and also with at least one central tool, which is displaceable transversely in relation to the opening and closing movement of the blow-mold halves.

The invention also relates to an apparatus for carrying out the method.

A method of the type mentioned at the beginning is known for example from DE 10 2010 025 006 A1.

In the extrusion blow molding of plastic products, use is often made of molding tools which comprise two blow-mold halves, which are formed so as to complement one another and together bound a mold impression or cavity. Each of the blow-mold halves comprises at least one part-cavity, which defines a part of the contour of the finished hollow body. A thermoplastic extrudate in the form of a tube or parison or in the form of sheets or webs or other sheet-like products is brought between the opened halves of the tool. The blow-mold halves of the tool close around the preforms, the preforms then being brought to bear against the inner wall of the part-cavities formed by the tool by means of differential pressure, so that the finished article has an outer shape that corresponds to the internal contour of the molding tool. The re-shaping of the preforms within the part-cavities of the tool takes place either by expanding the preforms by means of gas pressure and/or bringing the preforms to bear against the inner wall of the tool by means of negative pressure, which is applied by means of channels in the mold wall of the tool.

In the production of relatively complex technical components, such as for example fuel tanks, it is often necessary to attach various inserts in the hollow body to be produced. Valves, pumps, filling-level sensors, surge tanks and the like come into consideration for example as inserts. There are a wide variety of different ways in which these inserts can already be introduced into the hollow body during the production thereof, which obviates the need for inserts to be mounted later through openings provided in the hollow body after the production thereof and allows the hollow body to be produced completely in one operation.

For this reason there have recently been developed methods for producing fuel tanks in which a number of sheet-like preforms in web form of plasticated thermoplastic material are re-shaped/molded in a multi-part tool forming a mold impression and having two outer molds and a core, the outer molds performing an opening and closing movement in relation to one another and the core being used for attaching inserts to the inner wall of the hollow body to be produced. For this purpose, the tools are first closed around the core. The inserts are then attached to the preform in a given layout by means of the core. The core is removed between the blow-mold halves, and the blow-mold halves are then closed once again in order to finish the blow-molding of the fuel tank.

Such a method is known for example from WO 2007/088200 A1. A similar method is also known from U.S. Pat. No. 6,866,812 B2.

In the case of the method known from DE 10 2010 025 006, it is provided to close the parts of the tool or the blow-mold halves against a tool divider arranged between the preforms, the preforms being placed into the part-cavities by applying differential pressure and molded. In a separate method step, the tools are opened again and inserts of the hollow body to be produced are attached to the shells formed in the blow-mold halves. Subsequently, the tool is opened again, and the shells are joined together to form a closed hollow body by renewed closing of the tools and final blow molding is performed.

The method has the advantage that a simple tool divider, which does not have to be made to tool quality but only has to perform a sealing function, is used instead of a core. The overall depth of the tool divider can be set independently of the position and arrangement of the inserts to be introduced into the hollow body, so that it is no longer necessary to guide preforms in sheet or web form extruded in the direction of gravitational force above the tools.

This method and also the previously mentioned known methods all have the disadvantage that the tools have to perform relatively many opening and closing movements to complete a production cycle. The cycle time for the production of a hollow body worsens with the number of displaceable movements of the tools.

For the purposes of the present application, a cycle refers to the entire time from when the preforms are brought into the tool until the next time that preforms are again received by the tool.

Finally, in particular in the case of relatively large tanks to be produced, such as for example fuel tanks, the tools/blow-mold halves have a considerable mass, which has to be accelerated and decelerated during the opening and closing movements, which is likewise to the detriment of the cycle time.

The previously mentioned methods known from the prior art for processing preforms in web form are at a disadvantage with regard to the cycle times in comparison with the classic method of extrusion blow molding from an undivided extruded parison.

WO 2007/088200 is already based on the recognition that, in the case of a method using a core, the cycle time is prolonged, since it is first necessary to load the core with accessories, preheat them if necessary, then introduce the core provided with components into the molding tool, in order then to attach the components, and finally remove the core in order to be able to close the molding tool again and open it to carry out the demolding of the tank. As a solution, it is proposed in WO 2007/088200 to move the core in a controlled way with a variable speed and/or with optimum stopping positions of variable duration.

However, the improvements that are achieved by this method with regard to the cycle times are not significant.

The invention is therefore based on the object of providing a method of the type mentioned at the beginning with which the cycle time is improved in comparison with the known methods for processing preforms in web or sheet form to form hollow bodies.

The invention is also based on the object of providing an apparatus for carrying out the method.

Finally, the invention is based on the object of providing a method in which the required mass movements during a production cycle are reduced.

The object on which the invention is based is achieved by a method for producing hollow bodies from thermoplastic material by using an at least three-part blow-molding tool with at least two blow-mold halves, which define a mold impression, have part-cavities and can be displaced toward one another and away from one another in the sense of an opening and closing movement, and also with at least one central tool, which is displaceable transversely in relation to the opening and closing movement of the blow-mold halves, the method comprising the following steps:

a) extruding or providing and arranging at least two molten extrudates of thermoplastic material in web form between the opened blow-mold halves,
b) bringing the preforms to bear in the part-cavities of the blow-mold halves and molding them into shells using sealing elements which are provided on the central tool, can be extended from the central tool for the purpose of sealing off the part-cavities and are brought into contact with the blow-mold halves,
c) joining at least one insert in at least one shell by using the central tool arranged between the blow-mold halves,
d) removing the central tool from the displacement path of the blow-mold halves and joining the shells to form the closed hollow body by closing the blow-mold halves while applying clamping force and, if appropriate, final blow molding of the hollow body.

The previously mentioned steps are preferably carried out in the sequence in which they are enumerated.

The extruding or providing and arranging of two molten preforms in web form as provided by step a) may take place either by extruding preforms in parison form and cutting open the preforms at diametrically opposite points during or after the extrusion or by extruding preforms in web form from slot dies. The extrusion may take place above the opened tool in the direction of gravitational force. Alternatively, it is possible to produce the preforms at another location and bring them between the opened parts of the tool by means of grippers/manipulators.

The bringing to bear and molding of the preforms in the part-cavities of the blow-mold halves as provided by step b) may take place by applying negative pressure in the part-cavities and/or by applying positive pressure by means of one or more blowing pins or by means of one or more blowing connections provided on the central tool.

The invention can be summarized by stating that the method according to the invention deviates in principle from the procedure of displacing the blow-mold halves or blow-mold halves by a repeated opening and closing movement against an upright tool divider, an upright core or central tool. The invention obviates the need for at least part of the closing movement of the blow-mold halves for the purpose of sealing off the part-cavities and for the purpose of molding the preforms into shells or into half-shells. Sealing off of the part-cavities of the blow molds or blow-mold halves in their opened receiving position, for example under an extrusion head, is possible in principle by means of the sealing elements provided on the central tool. In this case, the required travel of the sealing elements may be provided exclusively by the central tool; alternatively, it is possible to superpose an extending movement of the sealing elements with a partial closing movement of the blow-mold halves.

It follows from this that significantly less mass has to be moved and it is already possible at this stage of the method to dispense with a complete opening and closing movement of the tool. A further advantage of the method according to the invention can be seen in the fact that a simplified tool concept/machine concept can be provided.

For the purposes of the present invention, a preform should be understood as meaning a sheet-like product in the sense of a web or a sheet of a molten, plastic material. It may be an extrudate that has been produced in one or more layers and has preferably already been discharged as an extrudate in sheet form from a slot die. An extrusion apparatus according to the invention that is provided for this purpose may comprise an extrusion head with one or more slot dies and one or more extruders for feeding various plasticated materials.

For the purposes of the present application, the preforms of thermoplastic material preferably consist of a number of layers based on HDPE with EVOH barrier layers for hydrocarbons. A typical extrudate may for example comprise a carbon-black-pigmented outer layer based on HDPE, a recycled layer, an adhesion promoter layer, an EVOH barrier layer, a further adhesion promoter layer and a plain, translucent HDPE layer, the above enumeration denoting the sequence of the layers from the outside to the inside with reference to the tank.

When the term blow-mold halves of the blow-molding tool is used hereinafter, this should not necessarily be taken to mean that the tool only consists of two parts in the sense of halves. Rather, each part of the tool may itself have a number of parts, in particular slides or other parts that are movable in relation to one another.

When reference is made hereinafter to complementary shells or complementary tool parts, this does not necessarily have to mean that the shells/part-cavities or tool parts are each identical.

The parting plane or contact plane of the tool does not have to be a geometrically centrally and perpendicularly extending plane, as described below on the basis of the exemplary embodiment.

For the production of the extrudates in web form, an extrusion head according to DE 10 2006 042 065 A1 may be used for example, reference to the full content of which is made here, including for the purposes of disclosure.

For the purposes of the present invention, complementary shells should be understood as meaning at least two shell-shaped components which are respectively formed matching one another in such a way that, when they are joined together or put together, the finished hollow body is obtained.

For the purposes of the invention, the hollow body is preferably a fuel tank.

An insert for such a hollow body or a fuel tank may be understood as meaning for example a valve, a surge tank, a filling-level sensor, a fuel feed unit or the like.

In the case of a fuel tank that is produced by the method according to the invention, preferably at least one shell is provided with a number of such inserts.

The preforms are preferably re-shaped in the still molten state, by using the heat of extrusion, in the part-cavities of the blow-mold halves. Particularly preferably, the re-shaping or molding takes place completely from the heat of extrusion, i.e. without any further heat being supplied to the preforms and without further plasticating energy being supplied. This does not exclude the possibility that the peripheries and/or pinch-off edges and/or delimited regions of the cavities and/or inserts of the tool are heated.

According to an expedient first variant of the method according to the invention, it is provided that the sealing off of the part-cavities takes place by a superposed adjusting movement of the blow-mold halves and the sealing elements of the central tool.

In the case of a particularly preferred and advantageous variant of this method, it is provided that, at the beginning of a blow-molding cycle, the central tool is loaded with at least one insert in a loading position and is then displaced into a working position between the blow-mold halves.

Particularly preferably, it is provided that loading of the central tool with at least one insert only takes place at the beginning of the blow-molding cycle, so that repeated displacement of the central tool, on the one hand for the preliminary molding of the shells in the part-cavities, on the other hand for the loading and joining, is not necessary, and this brings about a significant gain in cycle time. In the case of a particularly expedient variant of the method, it is provided that the joining of the at least one insert takes place by using an adjusting movement of the blow-mold halves toward the central tool, the sealing elements being retracted previously or at the same time. In this case it is also possible to move the sealing elements by means of the adjusting movement of the blow-mold halves, i.e. passively, back into the withdrawn or retracted position.

As sealing elements, sealing frames that can be hydraulically extended and retracted may be provided for example in an appropriately formed manner on both sides of the central tool.

A further variant of the method according to the invention is distinguished by the use of a two-part central tool, the parts of which are moved apart and brought to bear against the blow-mold halves for the purpose of sealing off the part-cavities before or while the part-cavities are subjected to differential pressure.

Such a variant of the method is advantageous particularly because the total travel required for the preliminary molding of the shells and for the joining can be provided just by the central tool. The bringing to bear and molding of the preforms in the part-cavities of the blow-mold halves may take place with blow-mold halves arranged fixed in place in the opened receiving position. Directly following step b) according to the procedure mentioned above, the joining of at least one insert in at least one shell may likewise take place by using a displacing movement of the parts of the central tool. In this case, the joining takes place exclusively by means of a displacing movement of the central tool in relation to the blow-mold halves arranged fixed in place in the opened position.

The object on which the invention is based is also achieved by an apparatus for carrying out the method, comprising a multi-part blow-molding tool with at least two blow-mold halves, which respectively form at least one part-cavity, the contour of which corresponds to the contour of a shell to be molded and which can be displaced toward one another and away from one another in the sense of an opening and closing movement, and also with at least one central tool, which can be displaced transversely in relation to the opening and closing movement of the blow-mold halves, the apparatus being distinguished by the fact that the central tool comprises at least two sealing elements, which are arranged such that they can be extended and retracted on both sides of the central tool.

As sealing elements, peripheral frames arranged on both sides of the central tool may be provided for example.

According to the invention, it may for example also be provided to superpose an extending movement of the sealing elements with an only partial closing movement of the blow-mold halves.

An alternative configuration of the apparatus for carrying out the method comprises a multi-part blow-molding tool with at least two blow-mold halves, which respectively form at least one part-cavity, the contour of which corresponds to the contour of a shell to be molded and which can be displaced toward one another and away from one another in the sense of an opening and closing movement, and also with at least one central tool, which can be displaced transversely in relation to the opening and closing movement of the blow-mold halves, the apparatus being distinguished by the fact that the central tool is divided in two in a plane running approximately parallel to the contact plane of the blow-mold halves and that the parts of the central tool can be respectively displaced from one another toward the blow-mold halves. Such an arrangement would be particularly favorable with respect to the cycle time, both with regard to the displacement path to be covered by the blow-mold halves and the displacement path to be covered by the central tool.

Such a central tool divided into two may be used both when moving the parts apart for sealing off the part-cavities and for initiating or carrying out a joining operation.

The central tool may for example comprise a component receptacle for joining at least one insert in at least one shell.

The central tool divided into two may likewise comprise at least two sealing elements which are arranged such that they can be extended and retracted on both sides of the central tool. The sealing elements are in this case likewise expediently formed as peripheral sealing frames on both sides of the central tool.

The design of the sealing frame is in this case preferably such that, on its side facing the blow-mold half, the sealing frame is designed such that it bears against the blow-mold half in a peripherally sealing manner. On its side facing the central tool, the sealing frame does not have to terminate in a sealing manner, if for example the molding of the shells takes place by subjecting the part-cavities to negative pressure. Instead of a sealing frame, a number of segments forming a frame may be provided, sealed with respect to one another for example at the mutually adjacent joints.

The sealing elements, for example in the form of sealing strips, may for example be formed such that they can be retracted and extended or swung in and out transversely in relation to an opening and closing movement of the tools.

In addition to the sealing elements provided on the central tool, adjustable sealing elements may likewise be provided on the blow-molding tool or on the blow-mold halves, for example the blow-mold halves may respectively have peripherally leading retractable and extendable sealing edges/sealing peripheries/sealing frames, by means of which part of the adjustment path of the tools in the sense of an opening and closing movement is accomplished.

Finally, instead of sealing elements in the form of frames or pressing strips or the like, discrete sealing elements may be provided, for example in the form of individual pins, which accomplish the effect of bringing the preforms to bear against the blow-mold halves.

The invention is explained below on the basis of an exemplary embodiment represented in the drawings, in which.

The figures show greatly simplified views of two exemplary embodiments of a multi-part tool as a blow-molding tool. The tool is represented in a simplified form to the extent that the mold cavity or the cavities has/have a simple contour in the form of an impression and the peripheries of the blow-mold halves 1a, 1b run around in a single plane, which forms the parting plane of the tool. In fact, the cavities of the blow-mold halves 1a, 1b may have a relatively broken contour/topography; the peripheries of the blow-mold halves 1a, 1b may be offset in a number of planes. Reference is made below firstly to the exemplary embodiment according to FIGS. 1 to 9. The blow-molding tool comprises two blow-mold halves 1a, 1b, which are displaceable toward one another and away from one another in the sense of an opening and closing movement and also a central tool 2, which is displaceable transversely in relation to the opening and closing movement of the blow-mold halves 1a, 1b. The entire arrangement is set up essentially under an extrusion head 3 on a common machine frame that is not represented. The blow-mold halves 1a and 1b are attached in a known way to mold platens 4, which are movable by means of a clamping frame that is not represented. Each of the blow-mold halves 1a, 1b defines a part-cavity 5a, 5b, which in the closed state of the blow-mold halves 1a, 1b form a mold impression for the article 6 to be produced, in the present case for a fuel tank.

Figure 1:
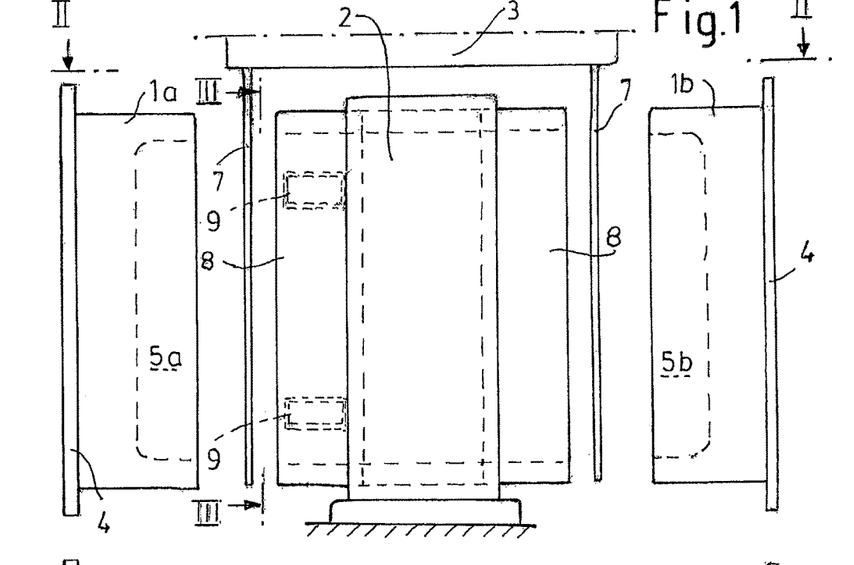
FIG. 1 shows a side view of an extrusion blow-molding device according to the invention as provided by a first exemplary embodiment.

Connected to the extrusion head 3 there are in a known way a number of extruders for feeding plasticated polymer to one or more melt channels. The extrusion head 3 may for example comprise two slot dies, from which preforms 7 of plasticated polymer in web form or sheet form are discharged in the direction of weight.

Figure 2:
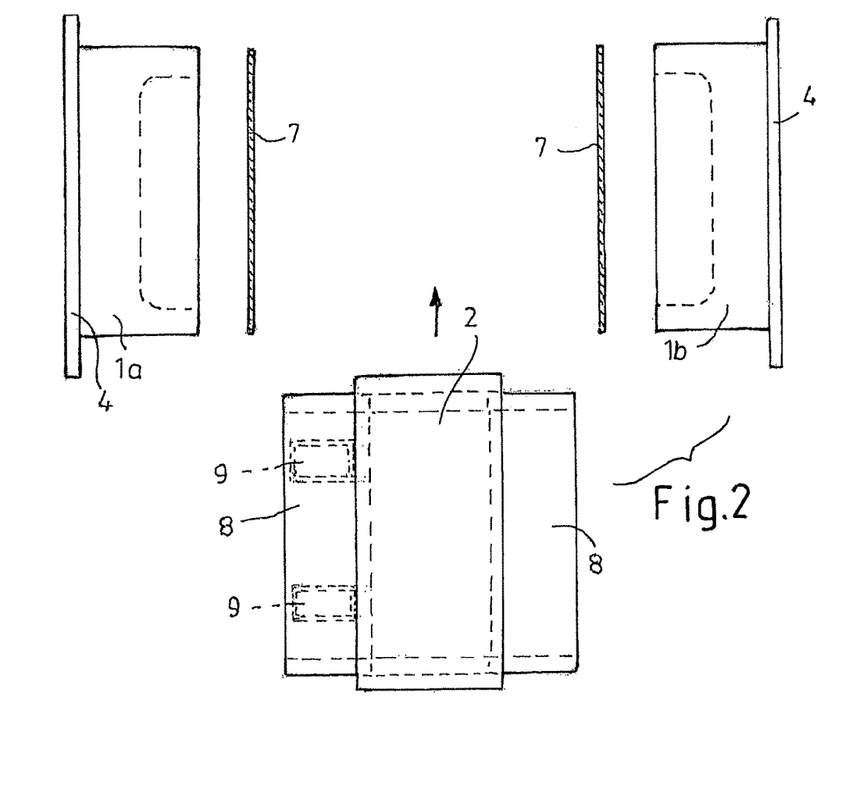
FIG. 2 shows a plan view of the extrusion blow-molding device that is shown in FIG. 1.
Figure 3:
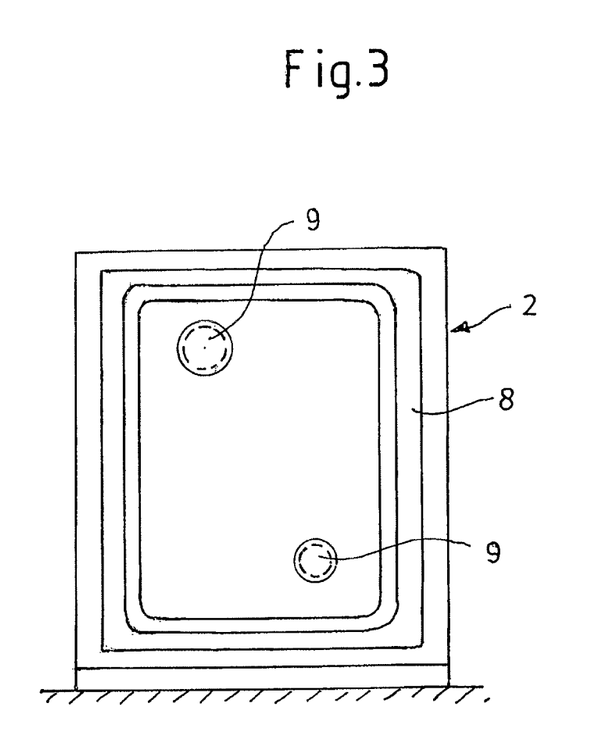
FIG. 3 shows a side view of a central tool along the arrows III-III in FIG. 1.

FIGS. 1 and 2 show the extrusion device according to the invention at the beginning of a cycle, in which the continuously extruded preforms 7 have been discharged from the extrusion head 3 to their intended final length. At the beginning of the cycle, the central tool 2 is located outside the displacement path of the blow-mold halves 1a, 1b.

The central tool 2 is formed as a frame or core, which on both sides is respectively provided peripherally with a sealing frame 8, which is formed such that it is hydraulically or pneumatically retractable and extendable in the direction of the blow-mold halves 1a, 1b. Furthermore, the central tool 2 is provided with receptacles (not represented), for inserts 9 to be introduced into the article 6 to be produced.

In the loading position of the central tool 2 that is represented in FIG. 2, it is loaded with the inserts 9 before the beginning of each cycle.

Figure 4:
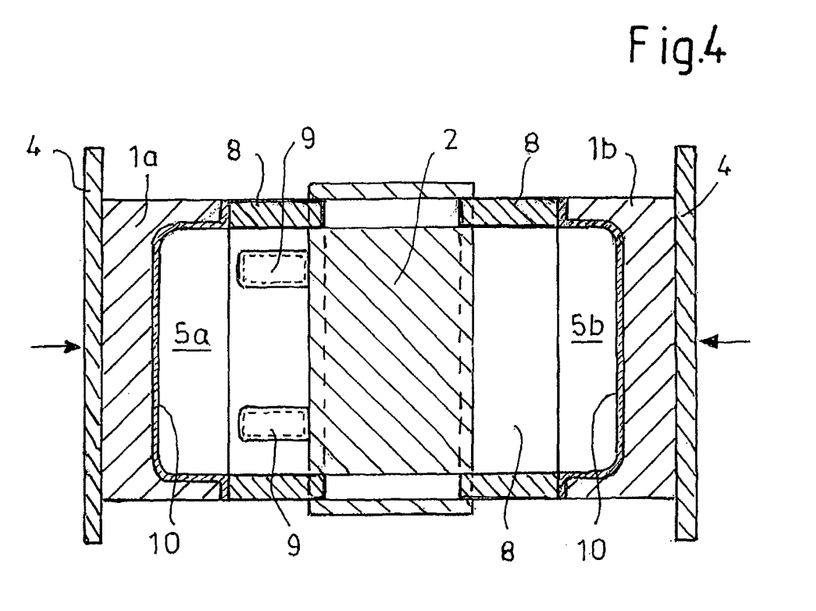
FIG. 4 shows a plan view of the extrusion blow-molding machine as provided by the first exemplary embodiment, with a sealing frame extended from the central tool, directly after the molding of the shells.

Starting from the positions represented in FIGS. 1 and 2, the central tool 2 is displaced under the extrusion head 3, between the preforms 7 extruded fully to length. The sealing frames arranged on both sides of the central tool 2 are shown fully extended. The extending movement of the sealing frames can be performed after loading of the central tool 2 during the displacement of the central tool 2 between the blow-mold halves 1a, 1b or after positioning of the central tool 2 between the blow-mold halves 1a, 1b. Subsequently or at the same time, the blow-mold halves 1a, 1b may be displaced against the sealing frames 8, as represented in FIG. 4, so that the sealing frames 8 bear in a sealing manner against the blow-mold halves 1a, 1b.

The contour of the blow-mold halves 1a, 1b in the region where they bear against the sealing frames 8 may in this case be formed such that a peripherally sealing and flush-bearing contact of the sealing frames 8 against the blow-mold halves 1a, 1b is ensured. As already mentioned above, the sealing frames merely have to ensure the leaktightness on the side facing the blow-mold halves 1a, 1b. The sealing frames 8 do not have to be closed all the way around the periphery on the side facing the central tool 2. In the drawings, the sealing frames are shown as retractable into the central tool 2 and extendable. Alternatively, the sealing frames 8 may be attached to the central tool 2 laterally or on the outside.

In the drawings, the respective contact plane is shown in a simplified form approximately parallel to the extent of the preforms 7. However, the invention should be understood such that the contact planes between the blow-mold halves 1a, 1b and the central tool 2 may be respectively offset and/or extend in an inclined plane.

The extending movement of the sealing frames 8 may be superposed by a movement of the blow-mold halves 1a, 1b; depending on the dimension of the sealing frames 8, or depending on the possible displacement path/adjustment path of the sealing frames 8, it may alternatively also be provided only to displace the sealing frames 8 in the direction of the blow-mold halves 1a, 1b arranged upright.

This is followed by an evacuation of the part-cavities 5a, 5b and/or them being subjected to blowing pressure, so that the preforms 7 are drawn into the part-cavities 5a, 5b. For this purpose, it may be provided for example that the preforms 7 are subjected to blowing air by means of the central tool 2, so that a differential pressure is produced on both sides of the preforms 7 in such a way that the preforms 7 are placed into the part-cavities 5a, 5b.

It goes without saying that the peripheries of the blow-mold halves 1a, 1b and the sealing frames 8 may be heated, in order that there is no premature cooling of the preforms 7 in the region of the contact areas between the sealing frames 8 and the blow-mold halves 1a, 1b.

In a further step, the blow-mold halves 1a, 1b are moved toward one another, the sealing frames 8 at the same time either being actively retracted or passively displaced by means of the blow-mold halves 1a, 1b, so that the inserts 9 come to bear against the warm-plastic shells 10, partially molded in the part-cavities 5a, 5b, by applying joining pressure. The receptacles for the inserts 9 that are provided in the central tool 2 and the travel movement defined by the sealing frames 8 are dimensioned such that secure joining of the inserts 9 is ensured.

The joining takes place either by welding and/or by so-called in situ riveting.

Figure 5:
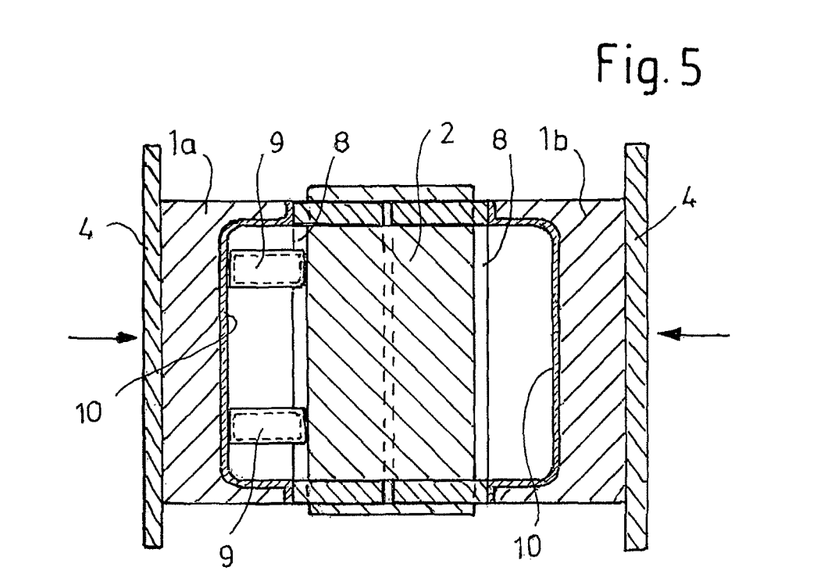
FIG. 5 shows a plan view of the extrusion blow-molding device in FIG. 4, during the joining of the inserts.
Figure 6:
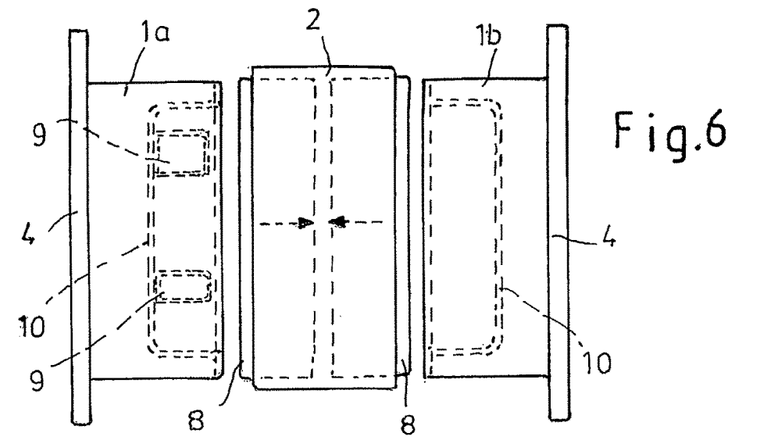
FIG. 6 shows a plan view of the extrusion blow-molding device in FIG. 5, directly after the joining of the inserts.
Figure 7:
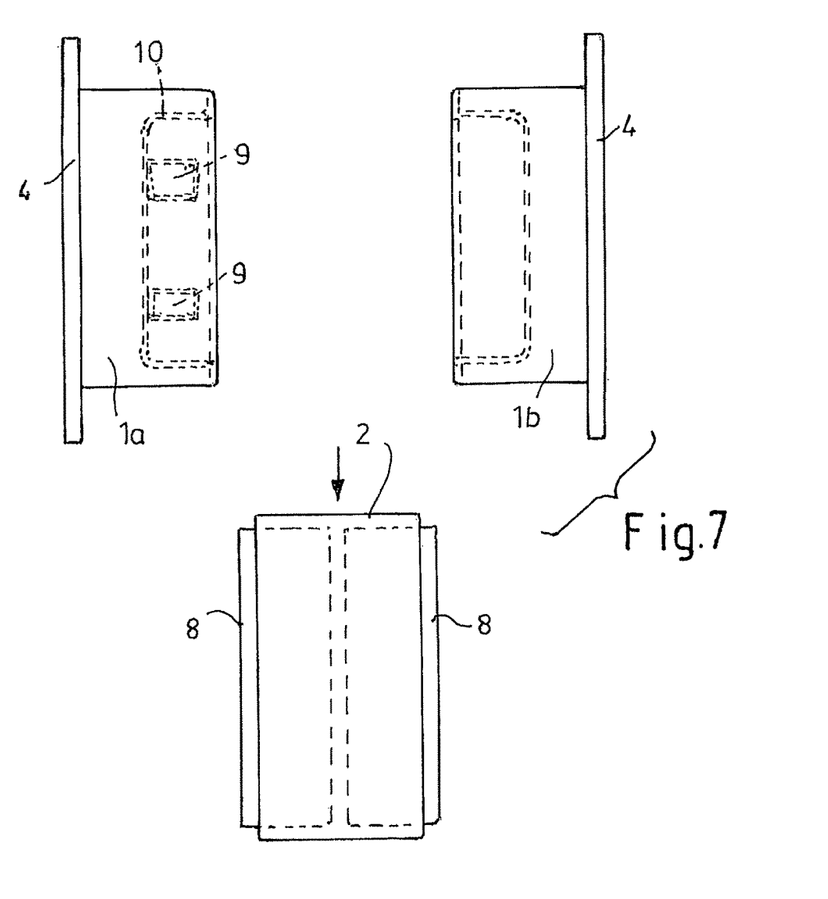
FIG. 7 shows a representation of the extrusion blow-molding tool directly before the step of joining the shells and welding the shells.

FIG. 5 shows the extrusion blow-molding tool according to the invention with blow-mold halves 2 closed against the central tool and with inserts 9 joined to the shells 10. As an alternative to the joining variant that is represented in FIGS. 4 and 5, the joining may also be performed actively (dynamic joining) by an extending movement of component holders that are arranged on the central tool 2.

It is also alternatively possible to carry out the operation of introducing inserts 9 with separate loading devices, without the assistance of the central tool 2.

Figure 8:
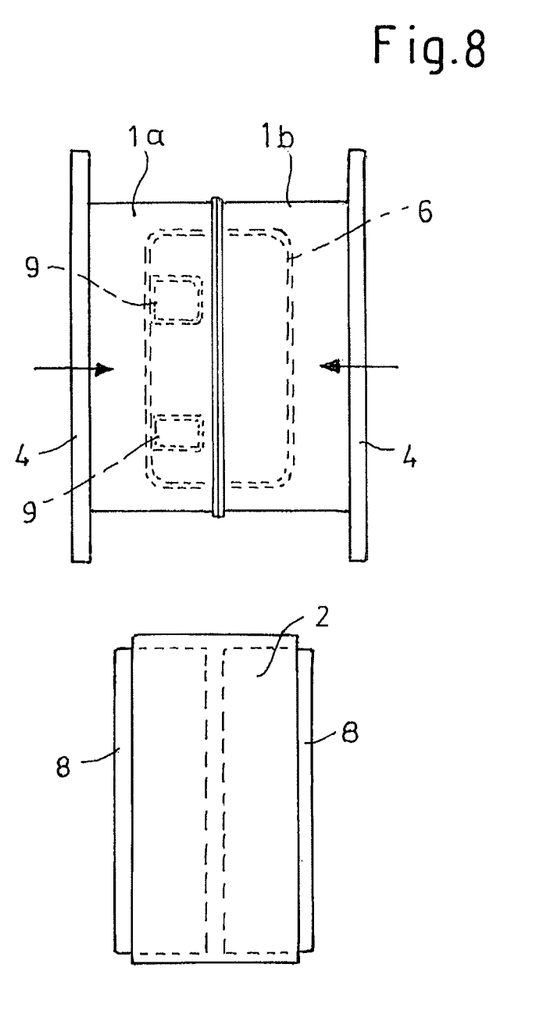
FIG. 8 shows a representation of the extrusion blow-molding tool during the joining of the shells.
Figure 9:
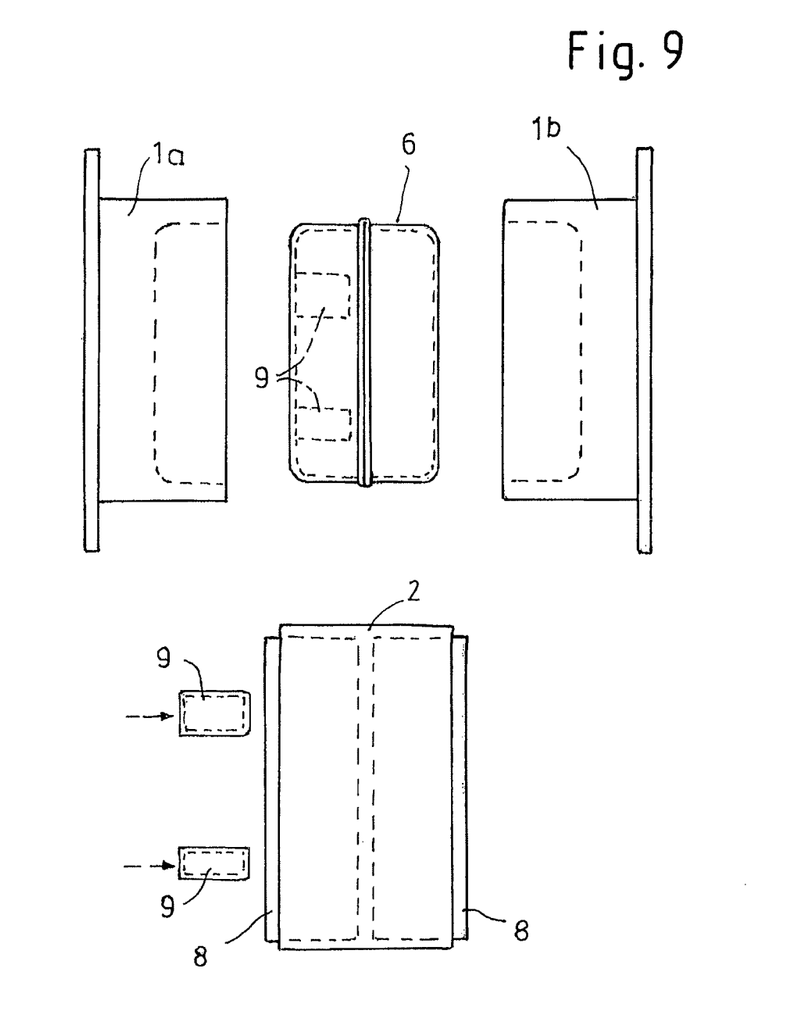
FIG. 9 shows the extrusion blow-molding tool during the removal of the article, the central tool being located in the loading position.

After the joining of the inserts 9, the blow-mold halves 1a, 1b are opened or moved apart and the central tool 2 is displaced transversely thereto into the loading position (FIG. 7), in which it can be loaded with inserts. Then, the blow-mold halves 1a, 1b are closed, by applying a corresponding clamping force, so that the shells 10 are welded to one another at the periphery to form the closed article 6. The article 6 thereby undergoes final blow molding by applying an increased blowing pressure (FIG. 8). Then, the blow-mold halves 1a, 1b are opened (FIG. 9) and the finished article 6 is removed.

An alternative configuration of the extrusion blow-molding tool according to the invention and a variant of the method according to the invention are explained below on the basis of FIGS. 10 to 14.

Figure 10:
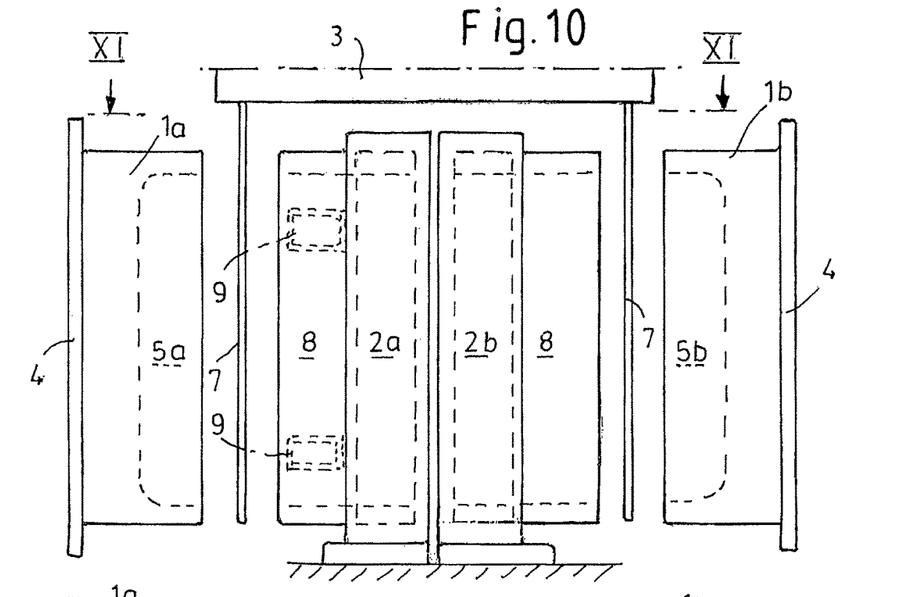
FIG. 10 shows a view of a second exemplary embodiment of the extrusion blow-molding device according to the invention.
Figure 11:
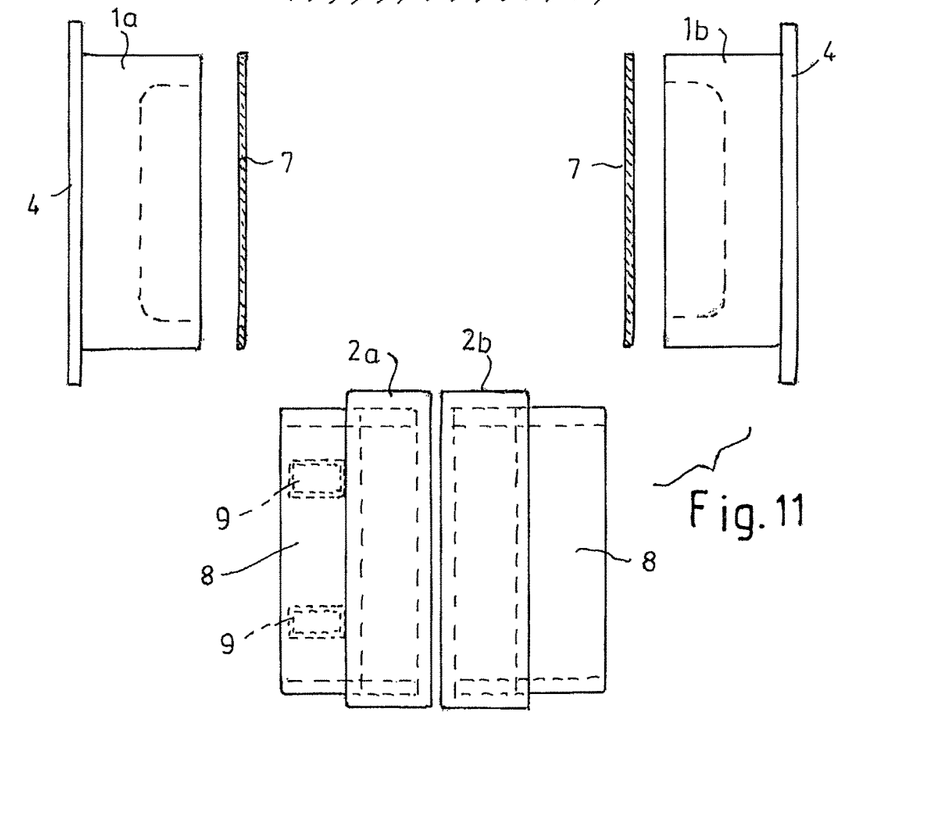
FIG. 11 shows a plan view of the extrusion blow-molding device represented in FIG. 10, at the beginning of the cycle.

FIGS. 10 and 11 correspond to FIGS. 1 and 2 with respect to the method. The same components are provided with the same designations.

The central tool 2 according to this embodiment of the extrusion blow-molding tool is divided approximately in the longitudinal center and comprises two plates 2a, 2b, which can be displaced toward one another and away from one another, i.e. in and counter to the closing direction of the blow-mold halves 1a, 1b. The term chosen here (plates) does not mean that the elements concerned of the central tool must be formed as plates in the strictly geometrical sense. They may also take the form of frames, with a peripheral contour extending in a number of planes.

In a similar way to in the case of the first exemplary embodiment, a sealing frame 8, which is formed such that it is retractable and extendable on both sides, is respectively provided on the plates 2a, 2b of the central tool 2. The sealing frame 8 corresponds to the sealing frame 8 according to the first exemplary embodiment. The parts of the central tool 2 may likewise be respectively formed concavely on their side facing the blow-mold halves and receive in these cavities receptacles or component holders for inserts that are not represented.

The described cycle begins with the position of the extrusion blow-molding tool that is represented in FIG. 11, in which position the preforms 7 have been extruded to their full length. The central tool 2 loaded with inserts 9 is brought between the blow-mold halves 1a, 1b, i.e. into the displacement path of the blow-mold halves 1a, 1b. As in the case of the first exemplary embodiment, the sealing frames may be extended before, during or after the displacement of the central tool 2 into the displacement path of the blow-mold halves 1a, 1b and serve the purpose of bringing the preforms 7 to bear against the blow-mold halves 1a, 1b and at the same time sealing off the part-cavities 5a, 5b.

In the case of this exemplary embodiment and in the case of the previously described exemplary embodiment, the operation of detaching the preforms 7 from the extrusion head 3 is not described. The detachment and removal may be performed by means of hot blades, hot wires or manipulators. These devices are not represented. The preforms 7 may have been extruded with thin locations in the regions intended for detachment; corresponding tools for fixing the preforms 7 or for removing the preforms 7 may for example likewise be arranged on the central tool 2 and are not shown for reasons of maintaining the simplified representation.

At this stage it should be noted that the extrusion of the preforms 7 may be performed both continuously and discontinuously.

In the case of this variant of the method and of the apparatus according to the invention, the travel for the purpose of molding the shells 10 and for the purpose of joining the inserts 9 is provided exclusively by the central tool 2; the blow-mold halves 1a, 1b remain arranged fixed in place in the completely opened position during the molding of the shells 10 and during the joining of the inserts 9. In this case, part of the adjustment path is brought about by a moving apart of the plates 2a, 2b in the direction of the blow-mold halves 1a, 1b and part of the adjustment path is brought about by an extending movement of the sealing frames 8. Alternatively, the travel required for the molding of the shells may be produced just by the extending movement of the frames 8; the travel that is further required for the joining may be provided exclusively by the displacing movement of the plates 2a, 2b. Any desired superposed movements between the plates 2a, 2b and the sealing frames 8 are possible.

Figure 12:
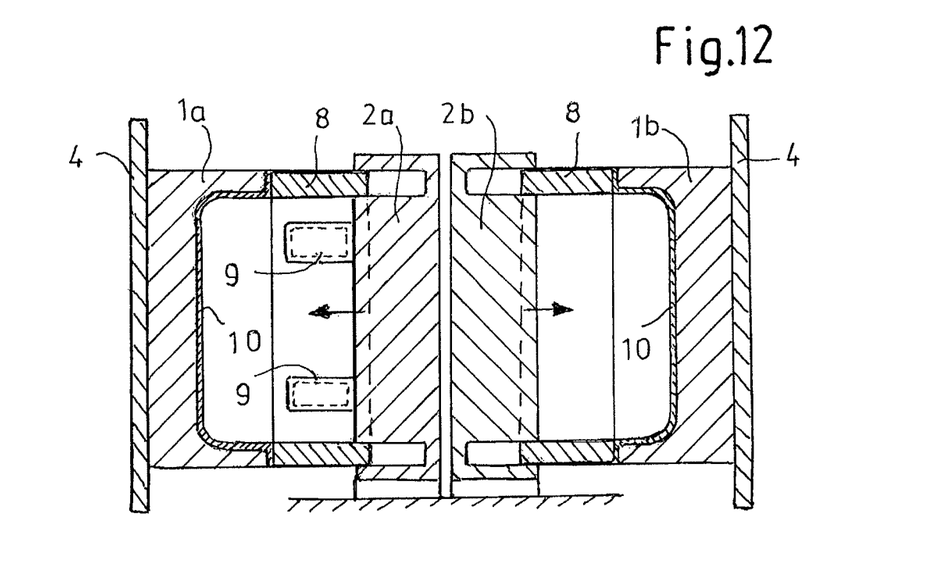
FIG. 12 shows a plan view of the extrusion blow-molding device according to the second exemplary embodiment of the invention, during or directly after the molding of the shells and before the joining of the inserts.
Figure 13:
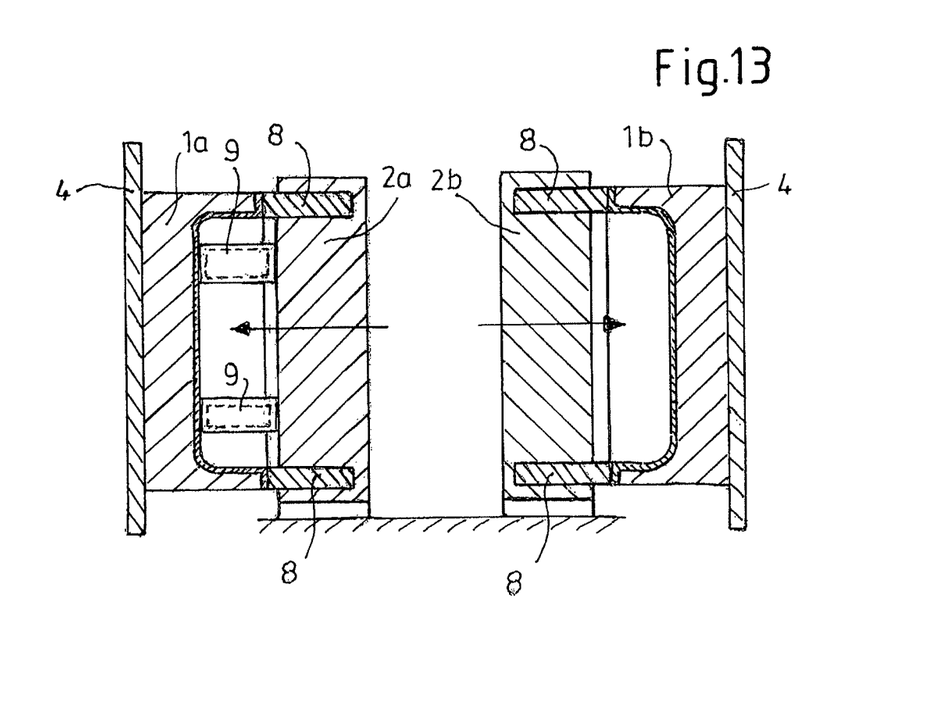
FIG. 13 shows a plan view of the extrusion blow-molding device as provided by the second exemplary embodiment of the invention, during the joining.

In FIG. 12, the operation of molding the shells is represented, the sealing frames 8 bearing in a sealing manner against the blow-mold halves 1a, 1b, which are in the completely opened position. The preliminary opening of the shells is followed by the joining of the inserts obtained by the moving apart of the plates 2a, 2b of the central tool 2 against the blow-mold halves 1a, 1b, the sealing frames 8 thereby being retracted either actively or passively by means of the adjusting movement of the plates 2a, 2b (FIG. 13).

The molding of the preforms 7 into shells 10 is performed by applying differential pressure (FIG. 12), it being possible as in the previous exemplary embodiment described for blowing air/gas pressure to be applied to them by means of the central tool 2. Alternatively or in addition, an evacuation of the part-cavities 5a, 5b may be provided. The plates 2a, 2b are closed at the rear, so that they seal off the part-cavities 5a, 5b.

Figure 14:
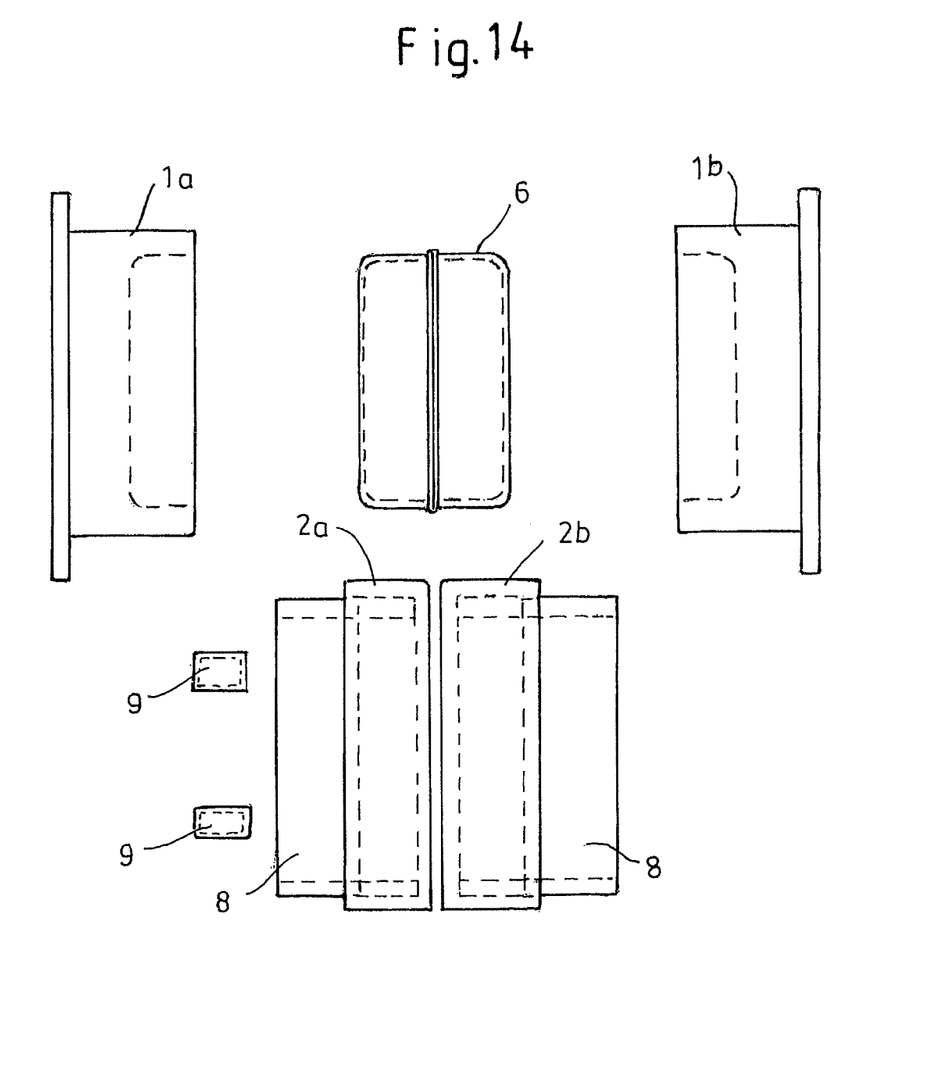
FIG. 14 shows a plan view of the extrusion blow-molding device as provided by the second exemplary embodiment according to the invention, during the removal of the article.

Subsequently, the plates 2a, 2b are moved together again and the central tool 2 is removed from the displacement path of the blow-mold halves 1a, 1b, i.e. displaced transversely thereto (see FIG. 14). Then the central tool is loaded with inserts 9. The central tool 2 is displaced with the inserts 9 attached thereto between the blow-mold halves 1a, 1b. The joining operation is then performed by renewed moving apart of the plates 2a, 2b of the central tool in the direction of the blow-mold halves 1a, 1b.

After the joining of the inserts 9, the central tool 2 is removed from the displacement path of the blow-mold halves 1a, 1b and the blow-mold halves 1a, 1b are closed against one another, by applying corresponding clamping forces, so that the shells 10 of the finished article 1 are joined peripherally against one another and are welded to one another. Then, the extrusion blow-molding tool is opened (FIG. 14) and the finished article is removed.

DESIGNATIONS

1a, 1b Blow-mold halves
2 Central tool 2a, 2b Plates of the central tool
3 Extrusion head
4 Mold platens
5a, 5b Part-cavities
6 Article
7 Preforms
8 Sealing frames
9 Inserts
10 Shells

What is claimed is:

1. A method for producing a hollow body from thermoplastic material, comprising:
    using an at least three-part blow-molding tool having
        at least two blow-mold halves, which each have at least one part-cavity and are displaceable toward one another and away from one another in an opening and closing movement, and
        at least one central tool, which is arrangeable between the blow-mold halves, and displaceable transversely in relation to the opening and closing movement of the blow-mold halves, and wherein the central tool includes at least one extendible and retractable sealing element,
    extruding or providing and arranging at least two molten performs of thermoplastic material between the blow-mold halves in an opened receiving position of the blow-mold halves,
    bringing the preforms into the part-cavities of the blow-mold halves and molding the preforms into shells using the sealing element on the central tool which is extended on the central tool for sealing off at least one of the part-cavities before and/or while the part-cavities are subjected to differential pressure and are brought into contact with the blow-mold halves,
    joining at least one insert in at least one shell of the shells by using the central tool arranged between the blow-mold halves,
    removing the central tool from between the blow-mold halves, and
    joining the shells to form the hollow body by closing the blow-mold halves while applying clamping force and, optionally, final blow molding of the hollow body.

2. The method as claimed in claim 1, wherein the joining of the at least one insert occurs by using a displacing movement of at least one blow-mold half of the blow-mold halves toward the central tool or in a direction of the central tool.

3. The method as claimed in claim 2, wherein the joining of the at least one insert occurs during or after the displacing movement of the at least one blow-mold half of the blow-mold halves.

4. The method as claimed in claim 1, wherein the sealing off of at least one of the part-cavities occurs by using superposed displacing movement of at least one blow-mold half of the blow-mold halves and the sealing element of the central tool.

5. The method as claimed in claim 1, wherein, at a beginning of a blow-molding cycle, the central tool is loaded with the at least one insert in a loading position not between the blow mold halves and is then displaced into a working position between the blow-mold halves.

6. The method as claimed in claim 1, wherein the joining of the at least one insert occurs by using a displacing movement of at least one blow-mold half of the blow-mold halves toward the central tool, and the sealing element being retracted previously or at a same time.

7. The method as claimed in claim 1, wherein the at least one central tool comprises a two-part central tool, the parts of which are moved apart and brought against the blow-mold halves for sealing off the part-cavities before and/or while the part-cavities are subjected to the differential pressure.

8. The method as claimed in claim 1, wherein the sealing off of the part-cavities occurs by using a displacing movement of the central tool and/or the sealing element of the central tool in relation to the blow-mold halves arranged fixed in place in an opened position.

9. The method as claimed in claim 1, wherein the joining of the at least one insert occurs by using a displacing movement of the central tool in relation to the blow-mold halves arranged fixed in place in an opened position.

10. An apparatus comprising:
    an at least three-part blow-molding tool having
        at least two blow-mold halves, which each have at least one part-cavity and are displaceable toward one another and away from one another in an opening and closing movement, and
        at least one central tool, which is arrangeable between the blow-mold halves, and displaceable transversely in relation to the opening and closing movement of the blow-mold halves, and
        wherein the central tool includes at least one extendible and retractable sealing element which is configured to seal at least one of the part-cavities of the blow-mold halves.

11. The apparatus as claimed in claim 10, wherein the at least one extendible and retractable sealing element are is formed as a peripheral sealing frame.

12. The apparatus as claimed in claim 10, wherein the at least one extendible and retractable sealing element which is configured to seal at least one of the part-cavities of the blow-mold halves further comprises at least two extendible and retractable sealing elements which are each configured to seal at least one of the part-cavities of the blow-mold halves.

13. The apparatus as claimed in claim 10, wherein the central tool comprises at least one component receptacle to hold at least one insert.

14. The apparatus as claimed in claim 12, wherein the at least two extendible and retractable sealing elements are arranged on opposing sides of the central tool.

15. The apparatus as claimed in claim 14, wherein each of the extendible and retractable sealing elements is formed as a peripheral sealing frame.

16. A method for producing a hollow body from thermoplastic material, comprising:
    using an at least three-part blow-molding tool having
        at least two blow-mold halves, which each have at least one part-cavity and are displaceable toward one another and away from one another in an opening and closing movement, and
        at least one central tool, which is arrangeable between the blow-mold halves, and displaceable transversely in relation to the opening and closing movement of the blow-mold halves, and wherein the central tool includes at least one extendible and retractable sealing element,
    extruding or providing and arranging at least two molten performs of thermoplastic material between the blow-mold halves in an opened receiving position of the blow-mold halves,
    extending the extendible and retractable sealing element of the central tool, arranging the central tool between the mold halves,
sealing at least one of the part-cavities of the blow-mold halves with the sealing element of the central mold before and/or while subjecting the part-cavities to a differential pressure which brings the preforms into the part-cavities of the blow-mold halves to form shells,
joining at least one insert in at least one shell of the shells by using the central tool,
retracting the extendible and retractable sealing element of the central tool,
removing the central tool from between the blow-mold halves, and
joining the shells to form the hollow body by closing the blow-mold halves while applying clamping force and, optionally, final blow molding of the hollow body.

* * * * *

UNITED STATES PATENT AND TRADEMARK OFFICE
CERTIFICATE OF CORRECTION

PATENT NO. : 9,776,357 B2  
APPLICATION NO. : 14/409672  
DATED : October 3, 2017  
INVENTOR(S) : Borchert et al.

It is certified that error appears in the above-identified patent and that said Letters Patent is hereby corrected as shown below:

On the Title Page

Item (54), and in the Specification, in Column 1, Line 3, in the Title, delete "MATERIALS" and insert -- MATERIAL --, therefor.

In the Claims

In Column 12, Line 16, in Claim 10, after "apparatus" insert -- , --.

In Column 12, Line 31, in Claim 11, after "element" delete "are".

Signed and Sealed this  
Twenty-seventh Day of March, 2018

Andrei Iancu  
*Director of the United States Patent and Trademark Office*